June 19, 1956

V. H. JUNGJOHANN ET AL 2,750,810

INTERLOCK CONTROL SYSTEM FOR MOTOR
AND TRANSMISSION OF PROJECTOR

Filed March 3, 1955

Vernon H. Jungjohann
George H. Hanken
Herbert T. Robinson
INVENTORS

BY Daniel I. Mayne
J. Griffin Little
ATTORNEYS

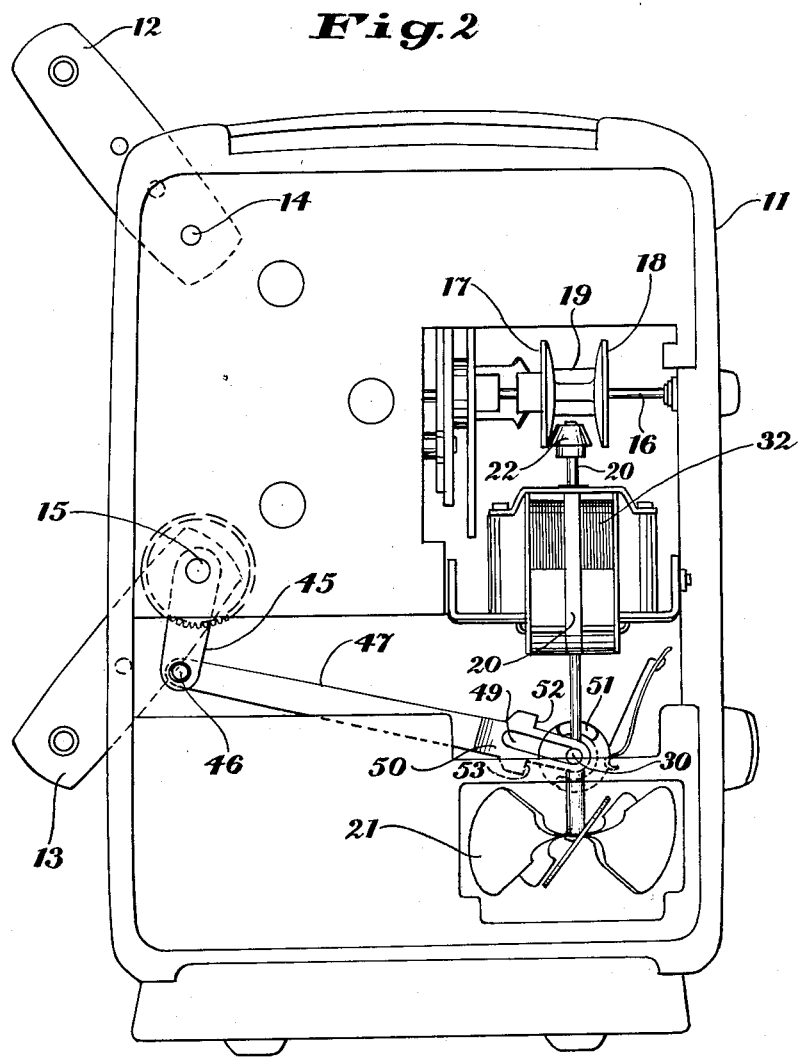

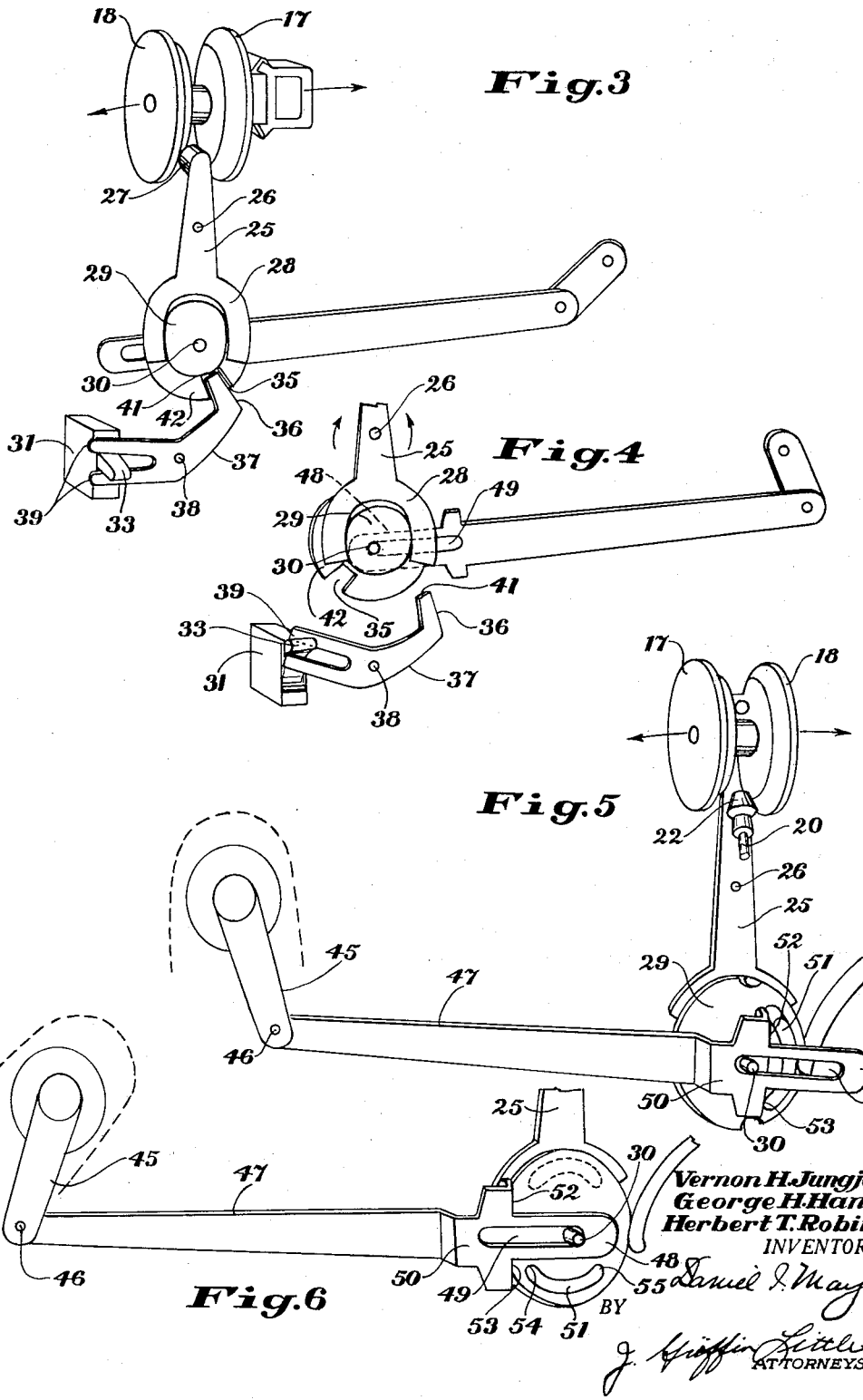

United States Patent Office 2,750,810
Patented June 19, 1956

2,750,810

INTERLOCK CONTROL SYSTEM FOR MOTOR AND TRANSMISSION OF PROJECTOR

Vernon H. Jungjohann, George H. Hanken, and Herbert T. Robinson, Rochester, N. Y., assignors to Eastman Kodak Company, Rochester, N. Y., a corporation of New Jersey Application March 3, 1955, Serial No. 491,866

2 Claims. (Cl. 74—472)

The present invention relates to photographic projectors, and more particularly to a projector control interlock system.

The structure of the present invention incorporates a drive system which includes a rubber cone or drive member mounted on a motor shaft and positioned between two axially movable discs slidably mounted on a shutter shaft. The discs are shifted in one direction by a control means to drive the projector mechanism forward, and are shifted in another direction to drive the mechanism in reverse. When the discs are in a neutral position, they are out of engagement with the drive member and "stills" may be projected.

An interlock is provided between the motor switch and the control means for the discs so that the motor cannot be turned off until the discs are in neutral position. Also, the control means cannot be operated until the switch is turned on so as to allow the motor to come up to speed without the mechanism load.

If the operator should inadvertently stop the motor by pulling out the cord, rather than return the discs to their neutral poseition, the drive member will remain in contact with one of the discs and a flat might be created on the drive member. Also, if the machine is subsequently started by plugging in the cord, the motor will start under load as the drive member is still in contact with one of the discs. To eliminate this difficulty, a link is provided for connecting the lower reel arm to the control means so the latter is actuated to move the discs to neutral position when the lower reel arm is folded or moved to an inoperative position. Then, when the motor is subsequently started it is not under the load of the mechanism.

The invention has as its principal object, the provision of a new and improved control interlock system for a projector.

Still another object of the invention is the provision of an arrangement in which the motor switch cannot be actuated to stop the motor until the mechanism is in a neutral or "still" position.

A further object of the invention is the provision of an interlock in which the mechanism cannot be operative until the motor switch has first been turned on.

And still a further object of the invention is the provision of an auxiliary means to return the mechanism to its neutral position.

Yet another object of the invention is the provision of an interlock which is simple in structure, comprises few parts of rugged construction, easy to operate, and highly effective in use.

To these and other ends, the invention resides in certain improvements and combinations of parts, all as will be hereinafter more fully described, the novel features being pointed out in the claims at the end of the specification.

In the drawings:

Fig. 2 is a side elevation view from the other side of the projector with the reel arms in their extended or operative position;

Fig. 3 is a view of one side of the interlock of the present invention, with the motor switch in the "off" position and the mechanism in neutral position;

Fig. 4 is a view similar to Fig. 3 with the motor switch in the closed position and the parts in position for driving the projector;

Figure 1:
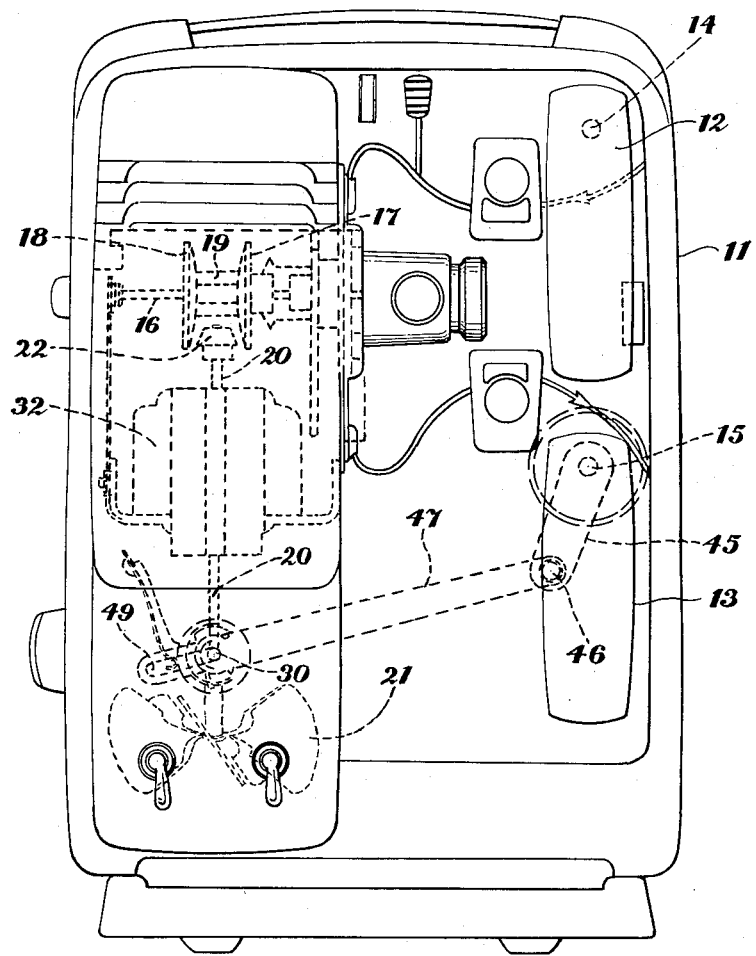
Fig. 1 is a side elevation view of one side of a projector, showing the relation thereto of the interlock constructed in accordance with the present invention, certain parts being omitted for purposes of clarity and with the reel arms in their folded or inoperative position.

Fig. 5 is a view similar to Fig. 4 but from the opposite side of the interlock, showing the arrangement for controlling the movement of certain of the parts from the reel arm, the parts being in their neutral position and the reel arm being folded; and Fig. 6 is a partial view of the mechanism illustrated in Fig. 5 with the reel arm in operative position and the control member arranged to move one of the discs into engagement with the drive member.

Figs. 1 and 2 show a projector housing or support 11 on which the parts of the mechanism of the present invention are mounted. The housing supports upper and lower reel arms 12 and 13 which are pivoted to the housing 11 at points 14 and 15 so that the arms may be swung to an operative position, as shown in Fig. 2, or may be moved to an inoperative position and within the housing 11, as shown in Fig. 1.

The housing 11 also carries a shutter shaft 16 on which are slidably mounted a pair of axially spaced discs 17 and 18, which are connected by a member 19 so that the discs will move axially as a unit. Also, a motor 32 is mounted in a fixed relation on the housing 11 and has a shaft 20 the lower end of which carries a fan 21, and the upper end has secured thereto a drive member 22 in the form of a rubber cone. The remaining parts of the projector, with the exception of the interlock to be later described, may be of any standard and/or suitable construction and form no part of the present invention. The particular form of projector shown herein is merely for illustrative purposes, and is not intended as a limitation.

The cone drive member 22 is positioned between the two slidable discs 17 and 18 as shown in the drawings. When the discs have been slid axially, by means to be later described, to bring the right disc 18, Fig. 2, into engagement with the cone 22, the projector mechanism will be driven in a forward direction. However, when the discs have been moved to bring the left disc 17, Fig. 2, into driven engagement with cone 22, the projector mechanism will be driven in reverse. Finally, when the discs have been adjusted to a neutral position, in which both discs 17 and 18 are out of contact with cone 22, Fig. 5, the mechanism is stationary, and "stills" may be projected. Thus, the direction of the drive may be controlled by shifting the discs 17 and 18 to bring one of the discs selectively into driven relation with the drive member or cone 22, as is deemed apparent.

In order to shift the discs axially, a rockable arm 25 is pivoted at its midpoint 26 on the housing and the upper end of the arm is provided with an actuating member 27 positioned between the discs 17 and 18, as best shown in Fig. 3. The lower end of arm 25 terminates in an annular portion 28 in which is positioned a rotary cam or eccentric 29 carried by one end of the shaft 30, the other end of which is provided with a suitable actuating knob, not shown. It is deemed apparent from an inspection of Fig. 3 that if shaft 30 and cam 29 are rotated counterclockwise, a clockwise rotation will be imparted to arm 25 to slide both discs to the right to cause the left disc 18 to be moved into driven relation with cone 22, as shown in Fig. 5. However, a clockwise rotation of the shaft 30 and eccentric 29 will move the arm 25 counterclockwise first to shift both discs 17 and 18 to the left to disengage disc 18 and cone 22, then moves both discs through a neutral position in which both discs are out of engagement with cone 22, as shown in Fig. 1. Further counterclockwise movement of arm 25 will finally move the discs far enough to the left, Fig. 3, to bring the right disc 17 into driven relation with cone 22. Thus, by rocking the shaft 29 and eccentric 30 in opposite directions, the discs 17 and 18 are moved axially to bring one of the discs selectively into driven relation with cone 22. The particular disc which is moved into engagement with cone 22 depends, of course, on the direction in which the projecting mechanism is to be driven. However, when both discs are out of contact with cone 22, as shown in Fig. 1, the parts are in a neutral position and the film moving mechanism is stationary so that "stills" may be projected, as is well known.

A tumbler-type switch 31 is connected into the motor circuit to control the starting and stopping of the motor. As the manner of connecting such a switch into the motor circuit is well known and forms no part of the present invention, details are not shown and are not deemed to be necessary. Suffice it to say, that when the switch 31 is in the position shown in Fig. 3, the circuit to motor 23 is open and the latter stops, but when the switch 31 is in the position illustrated in Fig. 4, the circuit to the motor is closed, and the motor will be running, all of which is deemed apparent.

The present invention provides a control interlock between switch 31 and the disc control member or arm 25. This interlock has two functions: (1) to turn on the motor before arm 25 is rocked so as to allow the motor to come up to speed before being connected to the mechanism load, and (2) to prevent stopping of the motor until the drive mechanism has been returned to its neutral or inoperative position with the cone 22 out of contact with both the discs 17 or 18, so that the projector cannot be started with the cone 22 in contact with one of the discs, thus preventing of a "flat" on the rubber cone 22.

To secure this result, annular part 42 carried by shaft 30 and keyed with eccentric 29 to shaft 30 contains a radial open slot 35 adapted to receive an end portion 36 of a lever 37 pivoted at 38 on the housing 11. The other end of this lever 37 is bifurcated at 39 to straddle the actuating member 33 of switch 31, as is clearly illustrated in Figs. 3 and 4.

Referring now to Fig. 3 it is seen that the end 36 of lever 37 is positioned in slot 35 so that the member 25 cannot be actuated to move the discs 17 and 18, the latter being in their neutral position. Also, the member 33 of switch 31 is in switch opening position so that the circuit of the motor 23 is open and the latter is at rest. The mechanisms are now in their inoperative position. To start the mechanism, the member 33 is moved upward to the position shown in Fig. 4 to close the switch 31 to energize the motor which then comes up to speed without the mechanism load, the advantages of which are deemed apparent. Such movement of member 33 to close switch 31 rocks lever 37 clockwise about pivot 38 to withdraw the end portion 36 out of slot 35 of part 42 to free the shaft 30, eccentric 29 and the pivoted arm 25.

Now, the shaft 30 and the eccentric 29 may be rocked in either direction by means of the control knob, not shown, such rocking or eccentric and cam will impart a rocking movement to member 25 to shift discs 17 and 18 axially to bring one of the discs into driven relation with the cone drive member 22. The particular disc engaged with the cone 22 will depend upon the direction of rocking of arm 25. When the direction of operation of the projector mechanism is to be changed, the arm 25 is merely rocked in the opposite direction by the opposite rotation of shaft 30 and cam 29 to bring the other disc into engagement with cone 22. Thus, the discs 17 and 18 may be moved selectively into driven relation with cone 22. It is to be noted, however, that due to the above-described interlock, the disc cannot be moved until the member 33 has first been moved to close the switch 31 so that the motor comes up to speed before throwing on the mechanism load.

When the motor is in operative relation, the interlock parts are in the position shown in Fig. 4 and the slot 35 has been moved out of registry with end 36 of lever 37. This out of registry relation results from the rocking of the member 25 to shift the discs 17 and 18. It will now be apparent from an inspection of Fig. 4 that any attempt to move the switch member 33 downward to open switch 31 will impart a counterclockwise rotation of the lever 37 about pivot 38. Such movement of lever 37 will cause the end 41 of the portion 36 to engage the periphery of part 42 on shaft 30. Furthermore, such engagement will occur before member 39 has been moved far enough to open switch 31. Thus, the interlock members 37 and 42 prevent opening of the switch 31 when the parts are in engaged relation. In order to open switch 31 it is first necessary to move cam 29, shaft 30 and annular member 42 in a counterclockwise direction from the position shown in Fig. 4 to that illustrated in Fig. 3. When the parts reach the position shown in Fig. 3, the discs 17 and 18 have been disconnected from cone 22 and the mechanism stops so as to take the load off the motor. Also, at that time slot 35 has been moved into registry with end portion 36 of lever 37. Now, when the switch operating member 33 is moved downward to the position shown in Fig. 3, to open the switch 31, the member 33 will impart a counterclockwise rotation about pivot 38 to move the end 36 into slot 35 as shown in Fig. 3 to lock the movable discs 17 and 18 against movement.

Thus, by means of the above-described interlock system the motor may be started without the mechanism load; and, after the motor is up to speed, the arm 25 is rocked to bring the desired disc 17 or 18 in driven relation with cone 22 to drive the projector mechanism in the proper direction. If it is desired to project "stills" it is necessary merely to return arm 25 to the position shown in Fig. 3 to disconnect discs 17 and 18 from the cone 22. While such "stills" are being projected, the member 33 of the switch 31 may be left in the position shown in Fig. 4 and the motor 23 will continue to run, but the projector mechanism will be stationary. Thus, when projecting or reversing is to be renewed, it is merely necessary to rock arm 25 in the proper direction to bring the correct disc 17 or 18 into engagement with cone 22. However, if it is desired to stop the machine, the arm 25 is first returned to the position shown in Fig. 3 to disconnect the mechanism from the motor. Then member 33 is merely flipped down to open switch 31 and rock lever 37 to move end 36 into slot 35 to lock the disc shifting mechanism.

In stopping the machine, the preferred practice is first to return the discs 17 and 18 to the neutral position, then trip the switch member 33, as above described. However, an operator may merely pull out the power cord to stop the machine. In such case, the switch 31 remains in its closed position and the cone 22 is in driving relation with one of the discs 17 and 18. If the parts are left in this position a "flat" may develop on the cone 22, the disadvantages of which are deemed apparent. Therefore, to eliminate such a possibility, the present invention provides an auxiliary arrangement for shifting the discs 17 and 18 to the neutral position.

As described above, the reel arms 12 and 13 are pivoted at 14 and 15 on the housing 11. When the machine is not in use, the arms 12 and 13 are swung about their pivots 14 and 15 from their operative position shown in Fig. 2 to their inoperative position shown in Fig. 1. The present invention utilized the folding or swinging operation of the lower arm 13 to shift discs 17 and 18 to the neutral position.

To secure this result, the lower pivot 15 is in the form of a shaft or bearing which rocks as arm 13 is rocked. This lower pivot 15 carries a crank 45 the lower end of which is pivotally connected at 46 to a link 47. The opposite end of link 47 is formed with an elongated portion 48 having a slot 49 adapted to receive the end of shaft 30 so that portion 48 will slide on the shaft, as is deemed apparent from an inspection of Figs. 5 and 6. The link 47 is also offset at 50 so that portion 48 will overlie cam 29. Now, as the arm 13 is swung from the position shown in Fig. 2 to the position shown in Fig. 1, the right end portion 48 of link 47 will move from the position shown in Fig. 6 to that shown in Fig. 5. It is this movement of link 17 which is utilized to shift the discs 17 and 18 to their neutral position.

To this end the cam or eccentric 29 is provided with an eccentrically positioned arcuate cam or lug 51. If the eccentric 29 is rocked clockwise to rock arm 25, the lug 51 will be moved to the full line position shown in Fig. 6, while a counterclockwise rotation of eccentric 29 and arm 25 will move lug 51 to the dotted line position shown in Fig. 6. Thus, when eccentric 29 and arm 25 are rotated to engage one of the discs 17 and 18 with cone 22, the lug 51 will be moved to one of the vertical positions illustrated in Fig. 6. Now, the right end portion 48 of line 47 is formed with a pair of vertically extending ears or lugs 52 and 53. With the parts in the position shown in Fig. 6, it is deemed apparent that when arm 13 is rocked to its inoperative position crank 45 will be moved from the position shown in Fig. 6 to that shown in Fig. 5 to impart a rightward movement to link 47 to bring the lower ear 53 into engagement with one edge 54 of lug 51 to rock the eccentric counterclockwise to the position shown in Fig. 5. Such counterclockwise rocking of eccentric 29 will shift arm 25 to move discs 17 and 18 to their neutral position and out of contact with cone 22. However, if the eccentric had been rotated counterclockwise, the lug 51 would then be in the dotted position illustrated in Fig. 6. Then, a rightward movement of link 47 will cause the upper ear 52 to engage the other edge 55 of lug 51 to impart a clockwise rotation to eccentric 29 to return the latter to the position shown in Fig. 5. This clockwise rotation of eccentric 29 similarly rocks arm 25 to shift discs 17 and 18 to their neutral position. Thus, when the lower reel arm 13 is swung about its pivot 17 to the inoperative position shown in Fig. 1, a rightward movement is imparted to link 47, as viewed in Figs. 2, 5 and 6. This rightward movement will engage lug 51 to rock the eccentric 29 and hence arm 25 in the proper direction to shift the discs 17 and 18 to their neutral positions. Therefore, even if the operator should stop the projector by pulling out the power cord, the folding of the lower reel arm will serve to disconnect discs 17 and 18 from cone 22, and return the parts to their neutral position.

By means of this arrangement, an auxiliary mechanism is provided for disconnecting cone 22 and discs 17 and 18. However, the switch 31 will still be in its closed position. Then, when the power cord is again inserted in its socket, the motor will start as the motor switch 31 is still closed, but as the discs 17 and 18 are disconnected, the starting of the motor will not be under load. Now, after the motor has been started by plugging in the cord, the shaft 30 and eccentric cam 29 may be rocked in the manner described to bring the discs 17 and 18 into driven relation with cone 22 to drive the projector in the proper direction, or the eccentric 29 may be left as it is and "stills" be projected.

The present invention thus provides a dual mechanism which effectively and completely disconnects the mechanism load from the motor so the latter can be started subsequently without load. Also, the interlock of the present invention effectively prevents the parts being shifted until the motor is first turned on, and the motor cannot be stopped by opening switch 31 until the parts have been returned to their neutral position, as shown in Fig. 3. Also, an auxiliary arrangement has been provided for returning the parts to their neutral position in the event that the mechanism is stopped by pulling out the power cord. The above-described interlock is simple in structure, comprises few parts, of rugged construction, easy to operate, and highly effective in use.

While one embodiment of the present invention has been described, it is to be understood that the inventive idea may be carried out in a number of ways. This application is, therefore, not to be limited to the precise details described, but is intended to cover all variations and modifications falling within the scope of the appended claims.

What we claim and desire to secure by Letters Patent of the United States is:

1. In a control interlock system, the combination with a support, a motor and a drive member actuated thereby mounted on said support, a switch on said support for starting and stopping said motor, a pair of spaced discs movably mounted on said support adjacent said drive member, of first means on said support for moving said discs selectively into and out of driven relation with said drive member, a cam on said first means, an arm movably mounted on said support for movement to and from an operative position, means connecting said arm to said moving means, and means on said connecting means engaging said cam when said arm is moved from said operative position to actuate said moving means to shift said discs out of driven relation with said drive member.

2. In a control interlock system, the combination with a support, a motor and a drive member actuated thereby mounted on said support, a switch on said support for starting and stopping said motor, a pair of spaced discs movably mounted on said support adjacent said drive member, of means for moving said discs relative to said drive means to bring one of said discs into driven relation with said drive member, a cam mounted on said moving means, an arm rockably mounted on said support for movement to and from an operative position, a link connected between said arm and said moving means and movable in one direction when said arm is moved from said operative position, and means on said link engaging said cam when said link is moved in said one direction to actuate said moving means to move said one disc out of engagement with said drive member.

References Cited in the file of this patent

UNITED STATES PATENTS

| | | |
|---|---|---|
| 246,741 | Foster | Sept. 6, 1881 |
| 621,160 | Sewell | Mar. 14, 1899 |

FOREIGN PATENTS

| | | |
|---|---|---|
| 19,163 | Netherlands | Dec. 15, 1928 |
| 90,405 | Austria | Dec. 27, 1922 |